May 14, 1963 K. GEBELE ETAL 3,089,401
PHOTOGRAPHIC SHUTTER
Filed April 18, 1960 2 Sheets-Sheet 1

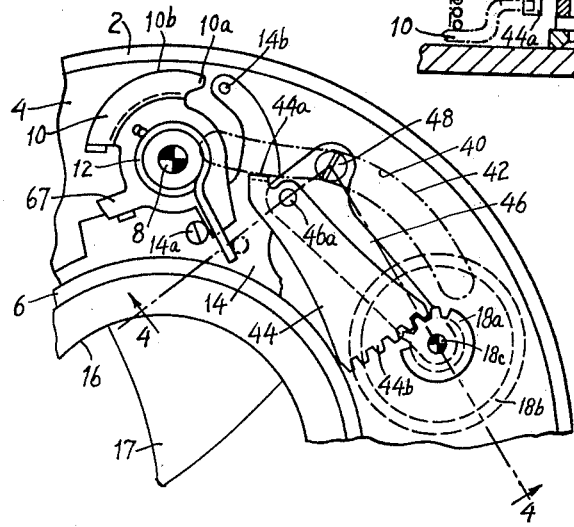

United States Patent Office 3,089,401
Patented May 14, 1963

3,089,401
PHOTOGRAPHIC SHUTTER
Kurt Gebele and Franz Singer, Munich, Germany, assignors to Compur-Werk GmbH & Co., Munich, Germany, a firm of Germany
Filed Apr. 18, 1960, Ser. No. 22,816
Claims priority, application Germany Apr. 21, 1959
7 Claims. (Cl. 95—63)

The present invention relates to a photographic shutter, and more specifically to a gear retardation for retarding a master member of a photographic shutter during its running down movement from a tensioned to a rest position, during which time the shutter blades are opened and closed to make an exposure. More particularly, the gear retardation is the type having a flywheel or inertia member, and the invention concerns the adjustment of the length of time during which the input end of a lever movement which transmits the driving force from the master member to the flywheel mass of the retarding gear projects into the path of motion of the master member during its running down movement.

Photographic shutter mechanisms with a gear retardation of the foregoing kind are known and have the disadvantage that the adjustment of the speed control member involves a simultaneous movement of the flywheel mass of the retarding gear, with the necessity of overcoming its inertial resistance. This is because the input end of the lever movement for transmitting the drive from the master member to the flywheel mass either serves at the same time as a speed adjusting member adapted to be positioned by external means for varying the period of engagement between the master member and retarding gear, or else is connected with the speed adjusting member to produce the same effect. As the flywheel mass is moved simultaneously with the speed control member during adjustment, its inertial resistance which must be overcome may be considerable, due to the transmission ratios in the retarding gear. This is a particular disadvantage in certain applications.

Accordingly, an object of the invention is to provide a generally improved and more satisfactory shutter mechanism having a gear retardation on which the shutter speed may be set with little effort.

Another object is the provision of a new and improved shutter retarding gear including a flywheel and arranged so as to be adjusted without substantially moving the flywheel mass, thereby to reduce the effort needed for adjusting the retardation period.

Still another object is to provide a new and improved retarding mechanism for delaying the running down movement of the master member of a shutter, the retarding mechanism having a flywheel mass and being arranged to be adjusted as to retardation time with less resistance than heretofore required for retarding mechanisms of this type.

These and other desirable objects may be attained in the manner disclosed as an illustrative embodiment of the invention in the following description and in the accompanying drawings forming a part hereof, in which:

FIG. 3 is a view similar to FIG. 1 illustrating a second embodiment of the driving mechanism of the retarding gear and its associated adjusting members;

FIG. 4 is a section of the mechanism shown in FIG. 3 taken approximately on the line 4—4 thereof;

FIG. 5 is a view similar to FIG. 1 of a third embodiment of the driving mechanism of the retarding gear; and FIG. 6 is a section of the mechanism shown in FIG. 5 taken approximately on the line 6—6 thereof.

The same reference numerals throughout the several views indicate the same parts.

The gear retarding mechanism of the present invention for the timing of shutter speeds is applied to a suitable objective shutter of the mechanically controlled type, such as, for instance, the shutter disclosed in Patent No. 2,785,612 to F. Singer, granted March 19, 1957. Only so much of the shutter as is essential to an understanding of the invention will be described, it being understood that the remaining mechanism may be of conventional construction.

Figure 1:
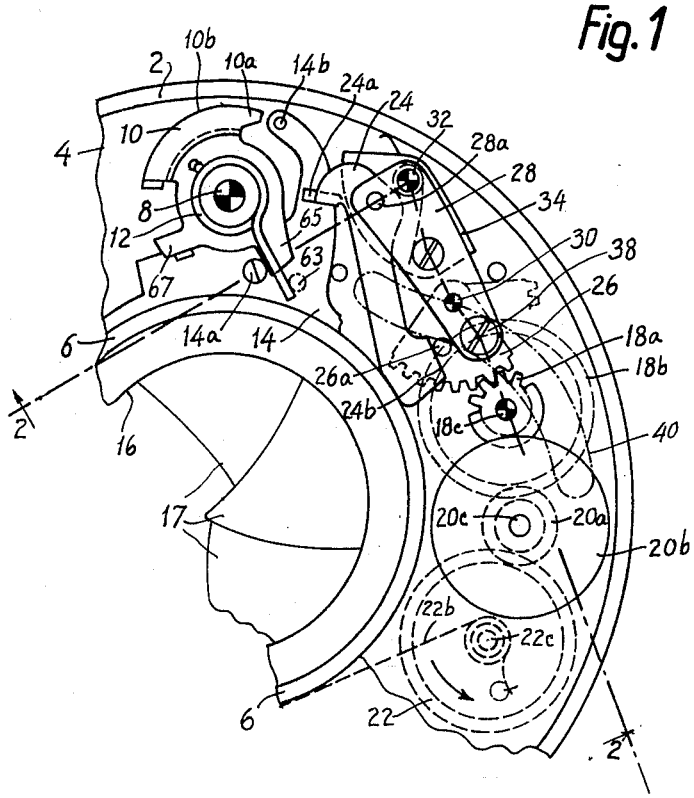
FIG. 1 is a fragmentary plan view of the master member and retarding gear of a shutter with its associated adjusting members, according to a first embodiment of the present invention.

Referring to FIG. 1, an objective shutter housing 2 is illustrated having a rear supporting plate or base plate 4 and an inner cylindrical forwardly extending lens tube or mount 6. Mounted on the base plate 4 is a pivot 8 about which is rotatable a master member 10. The master member 10 is acted upon by a drive spring 12 tending to turn the master member in a clockwise direction. The drive spring 12 is coiled about a portion of the master member and has one end reacting against a stationary stud 63 supported on the shutter housing, while the other end is secured to the master member 10 as by being bent over through an aperture therein. The master member 10 is set or tensioned by being rotated in a counterclockwise direction as, for instance, by a tensioning ring not here shown but corresponding, for instance, to the tensioning ring 30 provided in the aforementioned Singer patent. It is latched in tensioned position by any suitable releasable latch, such as the latch 42 of said Singer patent.

Upon releasing the master member 10 to make an exposure, the master member 10 runs down in a clockwise direction to move the shutter blade ring 14 to effect the opening and closing of the shutter aperture 16 by the usual shutter blades 17. The ring 14 is pivotally connected to the blades in the conventional manner, and may be mounted to turn on the lens tube 6 as a bearing, and has a pair of pins 14a and 14b to be engaged successively by radial arms 65 and 67, respectively, on the master member 10, to turn the blade ring first in one direction and then in the opposite direction, thereby to open and close the blades in a manner well known in the art and fully disclosed in said Singer patent.

Between the opening and closing of the blades 17, the running down of the master member 10 is retarded by a gear retarding mechanism according to the invention, the retarding action lasting for a variable period of time depending upon the shutter speed set. The retardation is achieved by the engagement of a cam projection 10a on the master member 10 with a rearwardly projecting lug 24a on a lever 24 providing the input to a lever movement for actuating the retarding gear mechanism. The gear retarding mechanism is of the type having a flywheel mass or inertia member, and includes an input pinion 18a fixed to a gear 18b, both being mounted for rotation on a pivot stud 18c which is fixed to the base plate 4. The gear 18b is in meshing engagement with a pinion 20a fixed to the flywheel or inertia member 20b, both being rotatable about a pivot stud 20c secured to the base plate. A final gear 22, in meshing engagement with the pinion 20a, rotates about a pivot pin 22c, and is coupled to a light or weak restoring spring 22b. The restoring spring 22b bears at one end against the lens mount 6 and is linked to the final gear 22 of the retarding gear to reestablish the starting position of the retarding gear after each operation of the shutter.

Figure 2:
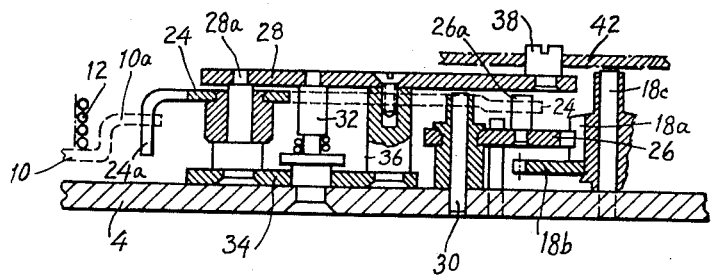
FIG. 2 is a cross-section of the mechanism shown in FIG. 1, taken approximately on the line 2—2 thereof.

Drive is transmitted to the retarding gear mechanism from the master member 10 by the previously mentioned lever movement of which the lever 24 is the first member. In addition to the retarding lever 24, the lever movement also includes an arcuate rack 26 and a timing lever 28. The retarding lever 24 is pivoted by a pin 28a to the timing lever 28, which in turn is pivoted on a stud 32 fixed to the base plate 4. In its normal rest position, one end of the lever 24 rests at its inner edge against the lens mount 6. A straight outwardly facing working edge 24b on the end of the lever 24 engages a driving pin 26a on the arcuate rack 26. Rack 26 is fixed to a bushing rotatable about a pin 30 fixed to the base plate 4, and has a toothed edge in meshing engagement with the pinion 18a of the retarding gear. If the available space is sufficient, it may be an advantage as shown in FIG. 2, to mount a reinforcing plate 34 loosely on the pivot pin 32 for the timing lever 28, and to connect this reinforcing plate with the lever 28 by a spacing stud 36 and by extending the pivot pin 28a downwardly to be supported on the plate 34. However, the necessary rigidity of the lever 28 and of its connection with lever 24 may be otherwise achieved by an appropriate arrangement which differs from that illustrated and incorporates no special reinforcing plate.

The rear end of the timing lever 28 carries an eccentrically fitted sliding pin 38 (see FIG. 2). This pin 38 is engaged in a time cam slot 40 in a speed control member 42. The shutter speed control ring 42, in which the cam slot 40 extends approximately circumferentially, may correspond with the control ring 63 disclosed in Patent No. 1,687,123 to F. Deckel et al., issued October 9, 1928. The control ring 42 may take the form of an annular sheet metal disk mounted for rotation about the lens mount 6, and is connected to an externally accessible member to be rotated for setting the shutter speed. The eccentric mounting of the sliding pin 38 permits the gear retarding mechanism to be adjusted in relation to the cam slot 40, for calibration purposes.

The gear retardation is shown in FIG. 1 in its rest position, and operates in the following manner. Upon the release of the shutter, the master member 10 is unlatched for running down movement in a clockwise direction under the actuation of the drive spring 12. The shutter blades 17 are initially opened by the striking of the projection 65 on the master member 10 against the pin 14a of the blade actuating ring 14, rotating the ring 14 in a counterclockwise direction to swing the shutter blades 17 to uncover the shutter opening 16. The cam projection 10a on the master member 10 strikes the projecting lug 24a of the retarding lever 24 at the instant the shutter blades reach fully open position, if the timing mechanism is set for an exposure of maximum duration (slowest shutter speed), or at a later instant if the timing mechanism is set for a shorter exposure (faster shutter speed). The lever 24 is thus swung on its pivot 28a, by the action of the member 10a, and the working edge 24b bears against the driving pin 26a of the arcuate rack 26, to deflect the rack 26 about its fulcrum 30. Rotation is thus transmitted to the flywheel mass 20b through the gear train 18a, 18b, and 20a. The retarding cam projection 10a of the driving member 10 can continue its rotation by deflecting abutment lug 24a of retarding lever 24 out of its path of motion. The master member 10 is then free to restore the shutter blades 17 to closed position in the usual manner by the striking of the projection 67 against the pin 14b to drive the blade ring 14 in a clockwise direction to pivot the shutter blades inwardly. The cam edge 10b of the master member 10 continues to retain abutment lug 24a in deflected position even after the driving spring 12 has unwound and the master member has reached its rest position. After the tensioning of the shutter ready for the next exposure operation, and the rotation of the master member 10 in a counterclockwise direction, the restoring spring 22b at the end of the retarding gear mechanism reestablishes the original rest positions of the retarding gear and of the abutment 24a.

The length of the arc of effective contact between the cam projection 10a and abutment lug 24a, that is to say the period of retardation, can be varied in accordance with the selected shutter speed. This is accomplished by pivoting the timing lever 28 about its pivot 32 by means of the sliding pin 38 engaging in the cam slot 40 in the speed control ring 42. Adjustment of the ring 42 causes a displacement of pivot 28a along an arc which is roughly tangent to the arc of movement of the member 10a. As a result of the speed adjustment, the abutment lug 24a is moved circumferentially of the path of motion of the cam projection 10a, and the depth of overlap of abutment 24a with the arcuate patch of motion of cam 10a and hence the duration of engagement between cam and abutment can be thus varied and even reduced to zero by sufficient counterclockwise pivoting of timing lever 28. The displacement of the fulcrum of retarding lever 24, as will be understood by reference to FIG. 1, causes an approximately parallel displacement of the working edge 24b along the driving pin 26a, thus hardly affecting the angular position of the rack 26 or not affecting it at all if the shape of the working edge is suitably contrived. Consequently the retarding gear mechanism and more especially its flywheel mass 20b are not affected by the process of speed adjustment.

In FIGS. 3 and 4 is illustrated a second embodiment of the invention. The general arrangement of the shutter in FIGS. 3 and 4 is identical with that in FIGS. 1 and 2, corresponding elements being indicated by the same reference numerals. Moreover, not all of the retarding gear mechanism shown in FIG. 1 is repeated in FIG. 3. For transmitting a driving force from the master member 10 to the input pinion 18a of the retarding gear, this alternative embodiment provides a retarding lever 44. For adjusting the retardation period, the retarding lever 44 is mounted on a timing lever 46 which is fulcrumed immediately above the base plate 4 on the fixed pivot 18c of the input pinion. The timing lever 46 carries a sliding pin 48 which is formed eccentrically like the pin 38 in FIGS. 1 and 2, for adjustment or calibration purposes, and which is engaged in the cam slot 40 of the speed control member 42. Also the lever 46 carries at its front end a pin 46a upon which the retarding lever 44 is pivoted. The retarding lever 44 is formed at its front end with a rearwardly projecting abutment lug 44a to be engaged by the cam projection 10a of the master member 10, while its working edge at the other end is provided by the pitch circle of an arcuate rack 44b having pivot 46a for its center. The inner edge of the rear end of the retarding lever 44 rests against the lens mount 6 as a support in its rest position, under the action of restoring spring 22b.

Upon adjustment of the shutter speed setting or control member 42 to the selected shutter speed, it can be seen that the abutment lug 44a is adjusted generally radially with respect to the path of motion of the master member 10, to vary the depth of engagement between the projection 10a and the lug 44a. During the adjustment there is no substantial travel of the rack 44 on the pinion 18a, so that the flywheel mass is not moved.

A third embodiment of the invention is shown in FIGS. 5 and 6. The retarding lever 50 in this modification is formed with an abutment lug 50a and is secured to a bushing rotatable about a pivot pin 52 fixed to the base plate 4. The retarding lever 50 is biased by a weak spring 56, coiled about its bushing and bearing against a pin 54 on the lever 50 at one end, while the other end of the spring reacts against a fixed pin 55 on the base plate 4. The action of the spring 56 urges the retarding lever 50 in a counterclockwise direction into contact with a driving pin 58a on the arcuate rack 58. The rack 58 is rotatable about a pin 60a on a timing lever 60, and has an arcuate toothed edge meshing with the pinion 18a of the retarding gear. In its rest position, the inner edge of the rack 58 bears against the lens mount 6, being held in place by the force of the restoring spring 22b (see FIG. 1).

The timing lever 60 is rotatably mounted immediately above the base plate 4 for movement about the pivot pin 18c of pinion 18a as a fulcrum. The timing lever 60 carries an eccentrically mounted sliding pin 62 which engages in the cam slot 40 in the speed control member 42. The operation of this form of the invention should be clear from the previous description. Adjustment of the speed setting member 42 causes a movement of the abutment lug 50a approximately circumferentially of the path of motion of the master member 10, to vary the depth of engagement of the projection 10a with the lug 50a. During this adjustment the flywheel mass 20b is not substantially moved, as there is no substantial travel of the rack 58 on the pinion 18a.

The illustrative embodiments here described clearly demonstrate eliminating the effect of the retardation resistance when adjusting the shutter speed. Owing to the reduction of the effort needed for setting the shutter speed, the invention successfully reduces the time required for moving the timing member into a different position. This additional advantage makes a shutter construction as herein proposed especially suitable for mechanisms in which the shutter speed is set automatically, for instance under the control of a built-in exposure meter. This advantage is of special merit when it is appreciated that automatic camera adjustment under the control of an exposure meter until now has been largely confined to adjustment of the easily movable and inertia-free diaphragm leaves. The fact that the flywheel mass of the retarding gear mechanism is not affected by the speed adjustment has the further advantage that the readjusted position of the timing member which is established in a relatively short time is unaffected by oscillations of the mass of the retarding gear, and hence is stable. This results in the elimination of fluctuations in exposure times which may occur when the shutter is released immediately after its speed has been automatically selected.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising a shutter housing having a baseplate and a lens mount extending forwardly therefrom, a rotatable master member mounted on said baseplate for running down movement from a tensioned position to a rest position, gear retarding mechanism including a flywheel and a restoring spring mounted on said baseplate for retarding said master member during its running down movement for an adjustably variable length of time, lever means arranged to transmit the driving force of said master member to an input gear of said gear retarding mechanism, said lever means comprising a plurality of interconnected levers including a first lever having an input lug which projects into the path of movement of said master member to be displaced by the running down movement of said master member, said first lever being fulcrumed on a timing lever which is rotatable about a fixed pivot on said baseplate and a third one of said levers having an arcuate rack in meshing engagement with the input gear of said gear retarding mechanism, a rotatable speed control member operatively connected to said timing lever to swing said timing lever and thereby to move said first lever to vary the extent to which it impedes movement of said master member, said first lever having an operating edge bearing against a part of said third lever to transmit motion of said first lever to said third lever when said first lever is displaced by the running down movement of said master member, said operating edge extending in the same general direction as the direction in which said first lever is moved by an adjusting movement of said timing lever so that such movement of said first lever does not substantially affect the position of said third lever and so that the flywheel of said gear retarding mechanism remains substantially at rest during the speed adjusting movements of said speed control member and lever means.

2. A construction as defined in claim 1, wherein one of said levers has an edge bearing against said lens mount as a support under the action of said restoring spring in the rest position of said gear retarding mechanism.

3. A photographic shutter comprising a master member mounted for running down movement from a tensioned position into a rest position, gear retarding mechanism including a flywheel for retarding said master member during its running down movement for an adjustably variable length of time, lever means arranged to transmit the driving force of said master member to an input gear of said gear retarding mechanism, said lever means comprising a plurality of interconnected levers having an input lug which projects into the path of motion of said master member to be displaced by the running down movement of said master member and also having an arcuate rack in meshing engagement with the input gear of said gear retarding mechanism, a rotatable speed control member having a timing cam slot, said lever means including a timing lever having a fixed pivot and a pin slidably engaged in said cam slot, rotation of said speed control member to adjust the shutter speed serving to pivot the timing lever and vary the depth of overlap of said input lug with the path of motion of said master member, characterized by the fact that said lever means is so shaped that adjustment of said lever means by rotation of said speed control member will cause substantially no travel of said arcuate rack on said input gear, whereby the flywheel and gear retarding mechanism have substantially no movement during the speed adjustment.

4. A construction as defined in claim 3, wherein said input lug is on a first lever which in turn is pivotally mounted on said timing lever to be moved bodily by an adjusting movement of said timing lever caused by rotation of said speed control member.

5. A construction as defined in claim 4, wherein said arcuate rack is on a third lever separate from said first lever and engaged by said first lever to be moved thereby when said first lever is displaced by the running down movement of said master member, the engaging parts of said first lever and third lever being so shaped that movement of said first lever caused by adjusting movement of said timing lever causes no substantial movement of said third lever.

6. A construction as defined in claim 4, wherein said arcuate rack is formed on part of said first lever.

7. A construction as defined in claim 3, wherein said input lug is on a first lever which is pivotally mounted on a fixed pivot, and wherein said arcuate rack is on a third lever which in turn is pivotally mounted on said timing lever in position to be engaged and moved by said first lever.

References Cited in the file of this patent

UNITED STATES PATENTS

| 2,410,629 | Carroll | Nov. 5, 1946 |
| 2,492,723 | Willcox | Dec. 27, 1949 |
| 2,588,980 | Hodges | Mar. 11, 1952 |
| 2,785,612 | Singer | Mar. 19, 1957 |
| 2,815,702 | Weise | Dec. 10, 1957 |